(12) United States Patent
Dasari et al.

(10) Patent No.: US 7,257,225 B2
(45) Date of Patent: Aug. 14, 2007

(54) SYSTEM AND METHOD FOR HIGH SPEED REVERSIBLE DATA ENCRYPTION

(75) Inventors: Srinivas V. Dasari, Scottsdale, AZ (US); Kevin T. Harvey, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 103 days.

(21) Appl. No.: 10/747,541

(22) Filed: Dec. 29, 2003

(65) Prior Publication Data
US 2005/0147252 A1     Jul. 7, 2005

(51) Int. Cl.
*H04K 1/00*         (2006.01)
*H04L 9/00*         (2006.01)
(52) U.S. Cl. .................. 380/28; 380/42; 380/44
(58) Field of Classification Search .............. 713/168; 380/28, 42, 44, 259
See application file for complete search history.

(56) References Cited

U.S. PATENT DOCUMENTS

| | | | |
|---|---|---|---|
| 3,662,343 A | 5/1972 | Goldstein et al. ........... 340/149 |
| 4,004,089 A | 1/1977 | Richard et al. ............... 380/46 |
| 4,849,927 A | 7/1989 | Vos | |
| 5,008,938 A | 4/1991 | Freeburg et al. | |
| 5,054,067 A | 10/1991 | Moroney et al. | |
| 5,261,001 A | 11/1993 | Dariel et al. | |
| 5,425,103 A | 6/1995 | Shaw | |
| 5,432,848 A | 7/1995 | Butter et al. | |
| 5,724,427 A * | 3/1998 | Reeds, III ................... 380/259 |
| 5,799,089 A | 8/1998 | Kuhn et al. | |
| 5,809,148 A | 9/1998 | Doberstein et al. | |
| 6,108,421 A | 8/2000 | Kurdziel et al. | |
| 6,252,958 B1 | 6/2001 | Rose | |
| 6,304,657 B1 | 10/2001 | Yokota et al. | |
| 6,490,357 B1 | 12/2002 | Rose | |

(Continued)

OTHER PUBLICATIONS

Savarese and Hart, "The Caesar Cipher", Trinity College of Computer Science, http://www.trincoll.edu/depts/cpsc/cryptography/caesar.html [last update Jul. 15, 2002, retrieved from internet Jan. 5, 2006].

*Primary Examiner*—Kambiz Zand
*Assistant Examiner*—Aubrey H. Wyszynski
(74) *Attorney, Agent, or Firm*—Fitzpatrick, Cella, Harper & Scinto (57) ABSTRACT

The present invention provides systems and methods for facilitating encryption and decryption of data. In accordance with an exemplary embodiment of the present invention, an encryption key having a number of characters is located. A character in the encryption key is located to provide a located character in the encryption key. The number of characters in the data is determined. The position of the located character in the encryption key is shifted by a predetermined amount to determine a shifted position of the located character in the encryption key. Accordingly, the shifted position is located at a position in the encryption key that is the located character shifted by the predetermined amount. A first character in the data is translated with the character located at the shifted position to provide an encrypted character. The shifting and translating are repeated for any remaining characters in the data to provide encrypted data. The encrypted data may be decrypted using the above process, so that the encryption is reversible.

16 Claims, 2 Drawing Sheets

U.S. PATENT DOCUMENTS

| | | |
|---|---|---|
| 6,510,228 B2 | 1/2003 | Rose |
| 6,570,989 B1 | 5/2003 | Ohmori et al. |
| 6,578,150 B2 | 6/2003 | Luyster |
| 6,606,385 B1 | 8/2003 | Aikawa et al. |
| 2001/0010721 A1 | 8/2001 | Murakami |
| 2001/0014154 A1 | 8/2001 | Aikawa et al. |
| 2001/0038693 A1 | 11/2001 | Luyster |
| 2002/0018562 A1 | 2/2002 | Lim |
| 2002/0159589 A1 | 10/2002 | She et al. |
| 2002/0159599 A1 | 10/2002 | Matsui et al. |
| 2002/0191784 A1 | 12/2002 | Yup et al. |
| 2003/0002663 A1 | 1/2003 | Kurdziel |
| 2003/0026430 A1 | 2/2003 | Aikawa et al. |
| 2003/0028786 A1 | 2/2003 | Mustafa |
| 2003/0044008 A1 | 3/2003 | Umeno |
| 2003/0072444 A1 | 4/2003 | Hu et al. |
| 2003/0099352 A1 | 5/2003 | Lu et al. |
| 2003/0108195 A1 | 6/2003 | Okada et al. |
| 2003/0133568 A1 | 7/2003 | Stein et al. |

* cited by examiner

SYSTEM AND METHOD FOR HIGH SPEED REVERSIBLE DATA ENCRYPTION

FIELD OF INVENTION

The present invention relates generally to data encryption and, more particularly, to high speed data encryption using character shifting and translation in the encryption key.

BACKGROUND OF THE INVENTION

As business processes are becoming increasingly complex, the underlying software implementing the business processes is often becoming more difficult to test. One of the challenges in the testing process is the creation of live test conditions to validate the business related performance of the software in a real world situation. Moreover, artificially generated test data often fails to simulate live production conditions in terms of volume and complexity.

Software developers and business users attempt to circumvent the drawback of using test data (instead of live data) by copying the live data (e.g., production data, financial services data, etc.) to the test environment. Copying the live data allows for testing the software under real world conditions without substantially disrupting the business process. However, using live data (e.g., actual customer data) can create security and privacy breaches. Specifically, the live customer data is exposed to several users on a routine basis and the customer may not have provided certain users with permission to have access to such data. In the financial services industry, for example, this breach affects auditors working on bank readiness for financial services companies when security, privacy, and the integrity of customer data are important. In the healthcare industry, for example, such a breach affects patients' rights of privacy and confidentiality of medical information at a time when new federal laws make protecting such information important.

Furthermore, some existing encryption schemes use complex calculations which are time-consuming to perform (e.g., modulus operation), or inaccurate methods which are often unreliable (e.g., mapping dictionary words). In view of the foregoing, a need exists for systems and methods which facilitate encrypting data (e.g., information), so that unauthorized users can access only parts of the data. Moreover, a need exists for a high speed encryption routine for large and numerous customer files, including robust encryption that is quickly reversible.

SUMMARY OF THE INVENTION

The present invention provides systems and methods for facilitating encryption and decryption of data. In accordance with an exemplary embodiment of the present invention, data and an encryption key having a number of characters are located or identified. An encryption key can be located if an encryption key is pre-selected or selected if an encryption key is not pre-selected. A check is made to determine whether the encryption key is pre-selected, and if the encryption key is not pre-selected, a default value is chosen. The system locates a character in the encryption key to establish a "located character". The system also determines the number of characters in the data. The position of the located character in the encryption key is shifted by a predetermined amount in order to determine a "shifted position" of the located character in the encryption key. Accordingly, the shifted position is located at a position in the encryption key that is the located character shifted by the predetermined amount. The predetermined amount can be any amount. The first character in the data is translated with the character located at the shifted position in the encryption key to provide an encrypted character. The shifting and translating are repeated for any remaining characters in the data to provide encrypted data. Steps similar to the foregoing steps can also be used to decrypt encrypted data.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and wherein:

DETAILED DESCRIPTION

The following disclosure presents and describes various exemplary embodiments in sufficient detail to enable those skilled in the art to practice the invention, and it should be understood that other embodiments may be realized without departing from the spirit and scope of the invention. Thus, the following detailed description is presented for purposes of illustration only and not of limitation.

Systems and methods in accordance with various aspects of the present invention facilitate encryption and decryption of data. The present invention is applicable to many diverse areas to facilitate data encryption and decryption (i.e., the encryption is reversible). In an exemplary embodiment of the present invention, a system and method are provided to facilitate high speed bi-directional encryption and decryption of data. For example, the present invention can be used to encrypt and decrypt numerous and complex customer data (e.g., data files or records), underlying source data to validate logic, password or security data, employee data, patient data, merchant or vendor data, and the like.

If sensitive or confidential data needs to be tested or otherwise used, the present invention facilitates such testing without substantially compromising confidentiality. For example, if production data needs to be tested by an outside entity (without authorization to have access to all the data), the present invention facilitates restricted access to such data so that practical testing is possible. Oftentimes, actual production data is needed, instead of simulated production data. For example, testing software often uses actual production data in order to test the robustness of the software. If the production data includes data that is confidential, sensitive, or otherwise protected by privacy laws, the present invention facilitates an environment where such data can be accurately tested. In addition, if fraud or other illegal activity is a concern, the present invention can restrict access to data, which may be used for such activity. It will be understood that the present invention may be applied outside the context of the illustrated applications, but is illustrated as such for brevity. The present invention may be applied to any suitable context benefiting from encryption and decryption of data, and particularly high speed embodiments.

The particular implementations shown and described herein are illustrative of the invention and its best mode and are not intended to otherwise limit the scope of the present invention in any way. Furthermore, the connecting lines shown in the various figures contained herein are intended to represent exemplary functional relationships and/or physical couplings between the various elements. It should be noted that many alternative or additional functional relationships or physical connections may be present in a practical implementation of the invention.

The present invention is described herein in terms of functional block components and various processing steps. As will be appreciated, the present invention may be embodied as a method, a data processing system, a device for data processing, and/or a computer program product. It should be appreciated that such functional blocks may be realized by any number of hardware and/or software components configured to perform the specified functions. Accordingly, aspects of the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, JAVA™, COBOL, OBJECT REXX™, assembler, PERL, eXtensible Markup Language (XML), or the like, with the various algorithms being implemented on various platforms (e.g., OS/390, z/OS, SUN™ SOLARIS™, MICROSOFT™ WINDOWS™, UNIX, and the like) with any combination of data structures, objects, processes, routines, or other programming elements. Further, it should be noted that the present invention may employ any number of conventional techniques for data transmission, signaling, data processing, network control, and the like.

Figure 1:
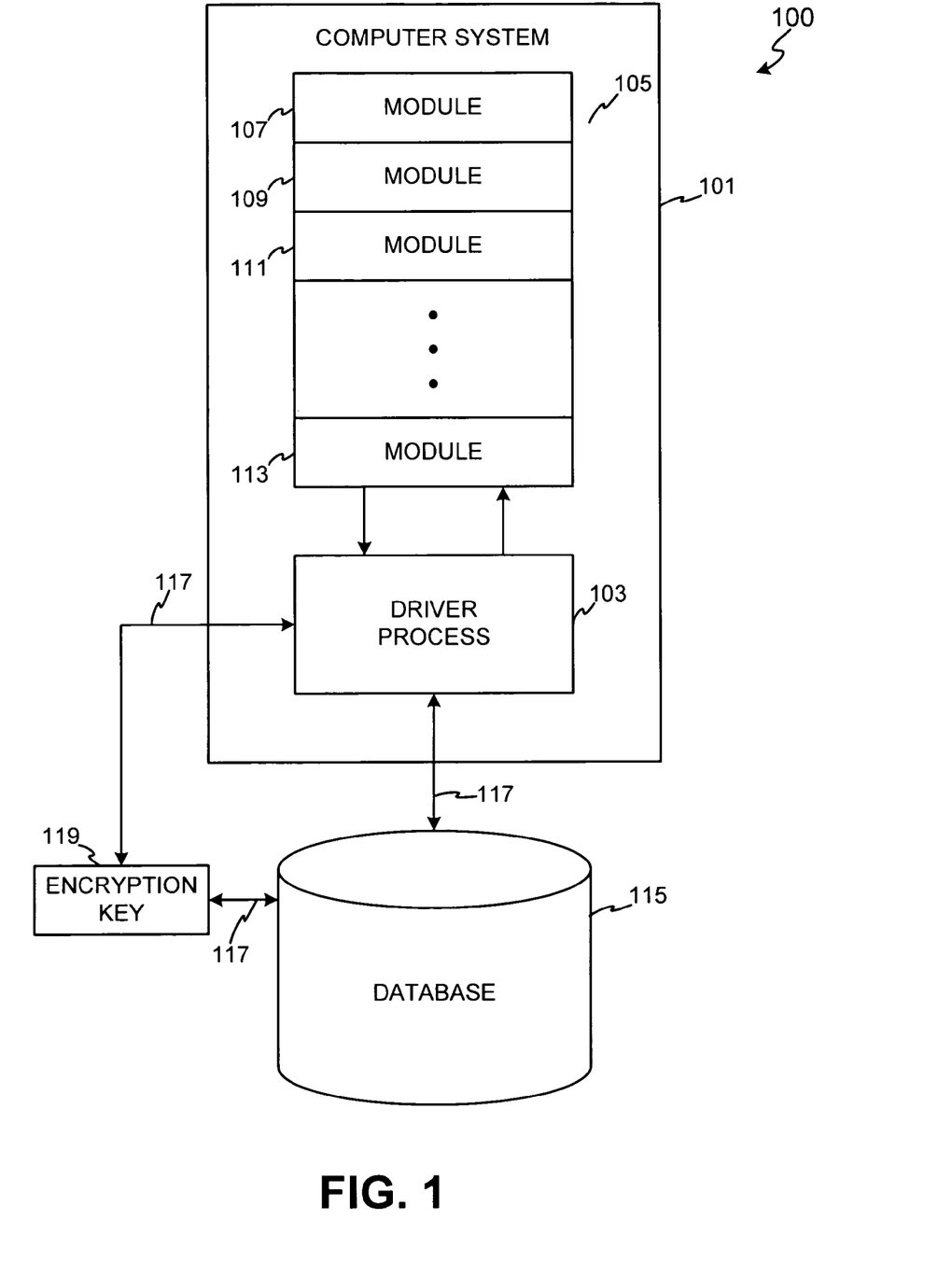
FIG. 1 is a block diagram of a system for encryption and decryption in accordance with an exemplary embodiment of the present invention.

FIG. 1 is a block diagram of a system 100 for encryption and decryption in accordance with an exemplary embodiment of the present invention. System 100 includes, in one embodiment, a computer system 101 and one or more databases 115, which may be configured to communicate through one or more communication channels 117. Computer system 101 may include a driver process 103 coupled to an encryption routine 105, where encryption routine 105 may include one or more modules 107, 109, 111, and 113 for encrypting and decrypting data. It is understood that encryption routine 105 may be used for both encryption and decryption of data, but is termed as such for simplicity.

System 100, as well as any of its component systems, may include a server or other computing system, including a processor for processing digital data, a memory coupled to the processor for storing digital data, an input digitizer coupled to the processor for inputting digital data, an application program stored in the memory and accessible by the processor for directing the processing of digital data by the processor, a display coupled to the processor and memory for displaying information derived from digital data processed by the processor and a plurality of databases, the databases including client data, merchant data, financial institution data and/or like data that could be used in association with the present invention.

Computer system 101 can be any computing unit, server, mainframe, or the like. Computer system 101 includes any hardware and/or software suitably configured to store information, run complex routines and logic, and interact with the other components of system 100. Although only one computer system 101 is illustrated in FIG. 1, it will be appreciated that system 100 may include any number of computer systems 101 in communication with any number of databases 115 through any number of communication channels 117. In the exemplary embodiment, computer system 101 and database 115 are separate systems, which may be located in one location or remotely located from one another. In an alternate embodiment, database 115 may be integrated within computer system 101. In such an embodiment, an integrated system may be components of a single computing device (e.g., separate modules of a single computing unit) or may be separate components of an integrated computing system, wherein computer system 101 and database 115 components of the computing system communicate with each other via a network that is separate from communication channels 117.

Each participant or user of system 100, including customers, purchasers, merchants, card issuers, financial services companies, healthcare oriented companies, and third-parties, for example, may be equipped with a suitable computing system to facilitate communications and transactions with any other participant. For example, some or all participants may have access to a computing unit in the form of a personal computer, although other types of computing units may be used, including laptops, notebooks, handheld computers (e.g., a Palm Pilot®), set-top boxes, kiosk terminals, personal digital assistants, cellular phones, and the like. Additionally, participants may have computing systems which may be implemented in the form of a computer server, PC server, workstation, minicomputer, mainframe, a networked set of computers, or any other suitable implementations which are known in the art or may hereafter be devised. A participant's computing system may include any suitable operating system, such as any version of WINDOWS™, WINDOWS NT™, WINDOWS 2000™, WINDOWS 98™, WINDOWS 95™, MacOS, OS/2, OS/390, BeOS, Linux, UNIX, or the like. Further, although the invention may be described herein as being implemented with TCP/IP communications protocols, it will be readily understood that the invention could also be implemented using IPX (Internetwork Packet Exchange), APPLETALK, IP-6, NetBIOS (Network Basic Input/Output System), OSI (Open Systems Interconnection), or any number of existing or future protocols. Moreover, the system contemplates the use, sale, or distribution of any goods, services, or information over any network having functionality similar to that described herein.

One or more databases 115 and any other data storage devices referred to herein may include any type of hardware and/or software device, which is configured to store and maintain data. Exemplary devices include any suitable type of database, such as relational, hierarchical, object-oriented, and/or the like. Common database products that may be used to implement databases 115 and any other data storage devices referred to herein include DB2 by IBM (White Plains, N.Y.), any of the database products available from Oracle Corporation (Redwood Shores, Calif.), MICROSOFT ACCESS™ by Microsoft Corporation (Redmond, Wash.), or any other database product. One or more databases 115 and any other data storage devices referred to herein may be organized in any suitable manner including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the data tables. A "key field" partitions the database according to the high-level class of objects defined by the key field. For example, a certain class may be designated as a key field in both the first data table and the second data table, and the two data tables may then be merged on the basis of the class data in the key field.

In an exemplary embodiment, computer system 101 and database 115 may be suitably coupled to communication channels 117 via data links. A variety of conventional communications media and protocols may be used for data links, such as a connection to an Internet Service Provider (ISP) over a local loop, as is typically associated with standard modem communication, cable modem, Dish networks, ISDN (Integrated Services Digital Network), DSL (Digital Subscriber Line), or various wireless communication methods. Computer system 101 and database 115 may each also reside within a LAN (Local Area Network), which interfaces to network 120 via a leased line (e.g., T1, D3, and/or the like). Such communication methods are well known in the art and are covered in a variety of standard texts. See, e.g., Gilbert Held, *Understanding Data Communications* (1996), which is hereby incorporated by reference.

Communication between participants in system 100 is accomplished through any suitable communication channel (e.g., communication channel 117), such as, for example, a telephone network, public switch telephone network, intranet, Internet, extranet, WAN (Wide Area Network), LAN, point of interaction device (e.g., point of sale device, personal digital assistant, cellular phone, kiosk terminal, automated teller machine (ATM), and/or the like), online communications, off-line communications, wireless communications, satellite communications, and/or the like. The network may also be implemented as other types of networks, such as an interactive television (ITV) network. It will appreciated that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

The computing systems may be connected with each other via a data communications network. For example, the network may be a public network, which is assumed to be insecure and open to eavesdroppers. In one embodiment, the network is embodied as the Internet. In this context, the computers may or may not be connected to the Internet at all times. For instance, a user's computer may employ a modem to occasionally connect to the Internet, whereas a merchant computing system, a financial services company computing system, and/or a healthcare oriented company system's computing system might maintain a permanent connection to the Internet. Specific information related to the protocols, standards, and application software utilized associated with the Internet are not discussed herein. For further information regarding such details, see, for example, Dilip Naik, *Internet Standards and Protocols* (1998); *Java 2 Complete*, various authors (Sybex 1999); Deborah Ray and Eric Ray, *Mastering HTML 4.0* (1997); and Loshin, *TCP/IP Clearly Explained* (1997). Each of these texts is hereby incorporated by reference.

The computer systems may also be interconnected to a card issuer via a second network, referred to as a payment network. The payment network represents existing proprietary networks that presently accommodate transactions for credit cards, debit cards, and other types of financial instruments or banking cards. The payment network is a closed network that is assumed to be secure from eavesdroppers. Examples of the payment network include the AMERICAN EXPRESS®, VISANET®, and VERIPHONE® networks.

In one exemplary embodiment of the present invention, computer system 101 communicates with database 115 via driver process 103. Computer system 101 locates an encryption key 119 having a number of characters. Encryption key 119 may be stored in database 115 (as illustrated), computer system 101, or otherwise provided to computer system 101 or system 100. Encryption key 119 may be pre-selected by the user (not shown) of system 100, or if encryption key 119 is not pre-selected, computer system 101 may select an encryption key (e.g., a default value). The default value can be any value. Encryption key 119 can be secret and unique to each user, so that other users of system 100 cannot encrypt and decrypt using another's unique encryption key 119. Of course, more than one user can use the same encryption key 119, if desired; however, system 100 is configured to also support individual unique encryption keys for each user. Once encryption key 119 is located, a character in encryption key 119 is located to provide a located character. The located character may be a first alpha character, a first numeric character, a special character, a Kth character (K being an integer) in encryption key 119, or any other character, which may be chosen by system 100, computer system 101, database 115, or the user. The position or location of the located character in encryption key 119 is represented by the term $c_f$.

In one exemplary embodiment of the present invention, the data is parsed into a set of characters C (or N) that are available to be encrypted. The sequence of the characters in set C (or N) can be in any order and can act as the encryption key 119 for encryption routine 105. In addition, the sequence of the characters in set C (or N) can be the data available to be encrypted. For example, $C=(c_1,c_2,c_3,c_4, \ldots ,c_n)$, a character set where n is any integer, or $N=(n_1,n_2,n_3,n_4, \ldots, n_m)$, a numeric set where m is any integer. Character sets C and N can be separate or combined as one character set. Much of the description may be illustrated using character set C; however, such description is also applicable to set N, but not described for brevity. The user (not shown) of system 100 can select the characters in set C (or N) as encryption key 119. However, if no set C (or N) of characters is specified by the user, a default character set C (or N) is selected by encryption routine 105 as encryption key 119.

If a character is missing from set C (e.g., the character "B"), then if encryption routine 105 is presented with a B to encrypt, then the character B would not be encrypted. Instead, the character B would not be changed, and the same character B would be used without encryption as though this character were encrypted. This allows for characters not otherwise included in set C (e.g., the character "$") to be retained even during encryption (and subsequent decryption).

Driver process 103 reads data from database 115 and accesses encryption routine 105 to parse the data to determine which parts (or all parts) of the data is to be encrypted. For example, driver process 103 can encode one or more fields of data in one or more customer records in database 115. The data can be parsed into a plurality of strings of data in order to determine which string of data is to be encrypted. For each customer record, for example, driver process 103 calls encryption routine 105 once for each character of data in the field. The number of characters (L or 1) in the data is determined, where L can be any number of characters including zero.

The data can take any form depending on the context in which system 100 is implemented. For example, if system 100 is implemented to encrypt data for one or more financial services companies, then the data in database 115 may be customer data (e.g., customer records including customer identification, financial, and security information). If system 100 is implemented to encrypt data for one or more healthcare related companies, then the data in database 115 may be patient data (e.g., patient records including patient identification, financial, medical, and other information). In either such embodiments or others, it would be desirable to encrypt at least some of the data (e.g., social security number, financial account information, passwords, patient identification information, patient medical history, and the like). Encryption routine 105 can be configured to parse the data depending on the needs of system 100, so that data ready to be encrypted is identified.

In one exemplary embodiment of the present invention, encryption routine 105 can be called from any driver process 103 which are, for example, written in the COBOL (Common Business Oriented Language) or OBJECT REXX™ languages. Encryption routine 105 is configured to encrypt and decrypt any data with any field length, where the field length is a number of characters L (e.g., 50 bytes). Once the number of characters (L or 1) in the data is determined, the position of the located character in encryption key 119 is shifted by a predetermined amount to determine a shifted position of the located character in encryption key 119. The shifted position of the located character is located at a position in encryption key 119 that is the located character shifted by the predetermined amount. The predetermined amount includes at least one of, for example: an amount relative to the number of characters (L) in the data, an amount equal to the number of characters (L) in the data minus one, an amount equal to a multiple of the location of the located character $c_f$, a calculated amount, an amount chosen by the user or system 100, and/or the like.

Once the shifted position of the located character is determined, the first character in the data is translated with the character located at the shifted position to provide an encrypted character. In this manner, the character set C may be shifted by $\propto$. This shifting of character set C is illustrated by C→$\propto$, which is the character set C shifted by $\propto$ characters to the right (or left). For example, the characters on the extreme right of character set C are wrapped around to the left. When $\propto$ is larger than the size of set C, it is possible this wrap around may complete one or more full rotations of character set C. Accordingly, C→$\propto$=($c_\propto, c_{\propto+1}, c_{\propto+2}, \ldots, c_{n-1}, c_n, c_1, c_2, \ldots c_{\propto-1}$).

The translation of the first character in the data with the character located at the shifted position to provide an encrypted character is represented by $(c_i, C\to\propto, C)=c_{(\propto+i-1)}$. This function translates the located character found in the set of characters C with the character (at a relative position) in character set C→$\propto$. For example, in accordance with one exemplary embodiment of the present invention, if S is a string of characters of length L=1 to be encrypted, each character is encrypted as follows:

S=string of characters=($s_1, s_2, s_3, \ldots s_1$)
E=encrypted string of S=($e_1, e_2, e_3, \ldots e_1$)
FOR i=1 to 1

```
{
    If s_i is a character in set C
        then
            e_i = translate (s_i, C → c_f*i + 1, C)
        else
            If s_i is a character in set N
                then
                    e_i = translate (s_i, N → c_f*i + 1, N)
                else
                    no translation of character
}
```

The encrypted data may be decrypted using system 100 in a manner similar to the encryption of data described herein. For example, encryption key 119 is located having a number of characters. A character in encryption key 119 is located to provide a located character. The number of characters in the encrypted data (e.g., encrypted string E) is determined. The position of the located character in encryption key 119 is shifted by a predetermined amount to determine a shifted position of the located character in encryption key 119. Accordingly, the shifted position is located at a position in encryption key 119 that is the located character shifted by the predetermined amount. The first character in the data (e.g., encrypted string E) is translated with the character located at the shifted position in encryption key 119 to provide an encrypted character. The shifting and translating steps may be repeated for any remaining characters in the encrypted data (e.g., encrypted string E) in order to provide decrypted data (e.g., string of characters S).

Thus, in accordance with various exemplary embodiments of the present invention, system 100 facilitates high speed bi-directional (or reversible) data encryption and decryption. Since encryption routine 105 uses less complex calculations (instead of complex calculations often used in encryption/decryption), system 100 is higher speed, so that it can encrypt and decrypt volumes and volumes of data quickly. For example, system 100 is useful in mainframe systems having voluminous data files for encryption and decryption. System 100 is bi-directional (or reversible) in that encryption routine 105 can encrypt and decrypt data. Therefore, system 100 facilitates secure encryption and decryption of data, so that users can more freely use sensitive data without substantially compromising confidentiality.

Figure 2:
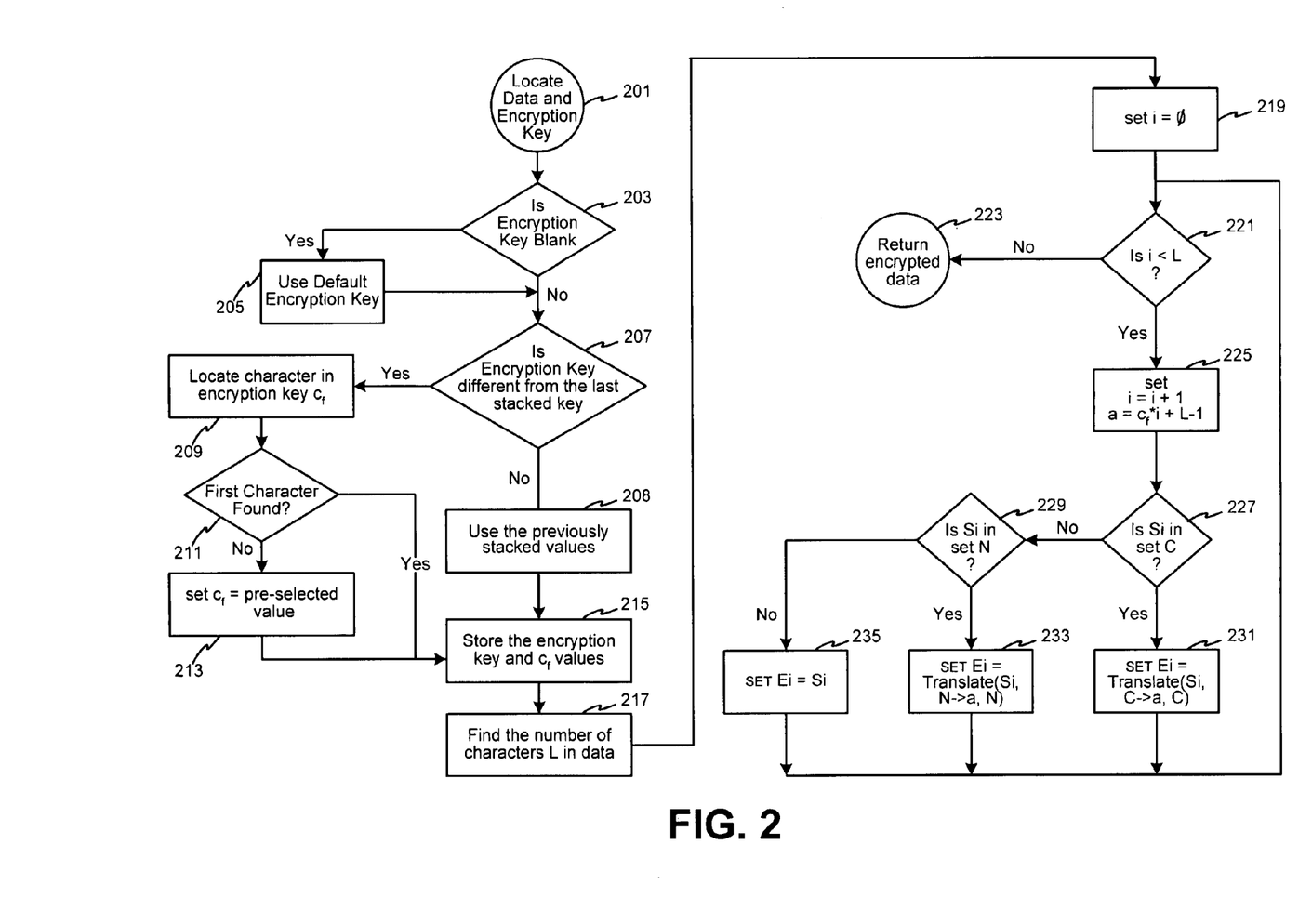
FIG. 2 is a flowchart of a method for encryption and decryption in accordance with an exemplary embodiment of the present invention.

FIG. 2 is a flowchart of a method for encryption and decryption (e.g., within system 100 of FIG. 1) in accordance with an exemplary embodiment of the present invention. Although FIG. 2 illustrates a series of method steps, it will be realized that the order of particular steps may be altered and/or other steps may be omitted altogether while still attaining the same or a similar result. It will be understood that the detailed description of FIG. 1 can operate and apply to the method steps in FIG. 2, so that some of the detail from FIG. 1 is not repeated in the discussion of FIG. 2 for brevity.

In accordance with an exemplary embodiment of the present invention, data and an encryption key 119 having a number of characters are located or identified (step 201). A check is made to determine whether encryption key 119 is blank (e.g., pre-selected or not) (step 203). If encryption key 119 is not pre-selected (i.e., blank), then a default encryption key 119 is used by system 100 (step 205). If encryption key 119 is pre-selected (i.e., not blank), then a further check is made to determine whether encryption key 119 is different from the last stacked (or used) encryption key 119 (step 207). If encryption key 119 is different from the last stacked (or used) encryption key 119, then a character $c_f$ is located in encryption key 119 (step 209). Accordingly, a character in encryption key 119 is located to provide a "located character." A check is also made to determine which character is found (e.g., a first alpha character) (step 211). For example, a first alpha character may be located in encryption key 119, if an alpha character is present in encryption key 119. A first numeric character may be located in encryption key 119, if a numeric character is present in encryption key 119. If a character is not found, then character $c_f$ is set to a pre-selected value (e.g., 1) (step 213). If a character is found (in step 211), then encryption key 119 and character $c_f$ are stored in computer system 101 (step 215). If the previous check determined that encryption key 119 is the last stacked (or used) (step 208), then encryption key 119 and character $c_f$ are stored in computer system 101 (step 215).

The number of chracters (L) in the data (e.g., string of characters $S=(s_1,s_2,s_3, \ldots s_1)$) are determined (step 217). Specifically, a counter i is set to 0 in order to begin at the beginning of the data (e.g., string of characters S) (step 219). A check is made to determine whether counter i is less than the number of characters L (step 221). If counter i is greater than or equal to the number of characters L, then the encrypted data $E=(e_1,e_2,e_3, \ldots e_1)$ is returned to computer system 101 (step 223). If counter i is less than the number of characters L, then counter i is incremented by 1 and the position of the located character in encryption key 119 is shifted by, for example, $\alpha = c_f*i+L-1$ (i.e., a predetermined amount) in order to determine a shifted position of the located character in encryption key 119 (step 225). The shifted position is located at a position in encryption key 119 that is the located character shifted by the predetermined amount. A check is made to determine whether Si is in character set C (step 227) or numeric set N (step 229).

If $S_i$ is in character set C, then the first character in the data is translated with the character located at the shifted position to provide an encrypted character $E_i$=translate $(S_i, C \rightarrow \alpha C)$ (step 231). If $S_i$ is in numeric set N, then the first character in the data is translated with the character located at the shifted position to provide an encrypted character $E_i$=translate $(S_i, N \rightarrow \alpha, N)$ (step 233). If Si is not in character set C or numeric set N (e.g., a special character, such as '$'), then $E_i=S_i$ (i.e., the first character is not encrypted but still returned as part of the data being encrypted) (step 235). A check is made again to determine whether counter i is less than the number of characters L in order to determine whether all the data has been encrypted (step 221). If counter i is less than the number of characters L, then the remaining steps are repeated to further encrypt the data. If counter i is greater than or equal to the number of characters L, then the encrypted data $E=(e_1,e_2,e_3, \ldots e_1)$ is returned to computer system 101 (step 223). Similar steps as the steps in FIG. 2 can also be used to decrypt encrypted data. Thus, FIG. 2 illustrates a method for facilitating encryption and decryption of data in accordance with an exemplary embodiment of the present invention.

With reference to FIGS. 1 and 2, and in accordance with one exemplary embodiment of the present invention, an example of encrypting the data "ABC 123" and electing to choose the first alpha character as the located character is as follows:

C=(L,B,I,X,#,T,M,Z,A,U,Q,C,G,N,P,O,K,R,S,F,J,V,W,D, Y,H,*,@,E,$), where C represents the set of alpha characters or encryption key 119;

$C_f$=9 (the position of the lowest alpha character present, which is "A");

N=(0,1,2,3, . . . 9,.,-,+), where N represents a set of numeric characters;

S="ABC 123" (data to be encrypted); and 1 (or L)=7 (number of characters to be encrypted, which includes the space between ABC and 123 in this example).

In this example, the shifting of the position of the located character is as follows: $c_f*i+1$ is shifted by 16 positions (9*1+7=16). The 9 is the position of the lowest alpha character present in set C (where set C is encryption key 119 in this example). The 1 is because it is the first character of the data "ABC 123" to be encrypted. The 7 is derived from the total number of characters (L=7) to be encrypted. This example generates the shifted value of C to C→16, where encryption key 119 (C) is shifted by 16. Accordingly, in this example, C→16=(O,K,R, S,F,J,V,W,D,Y,H,*,@,E,$, L,B,I, X,#,T,M,Z,A,U,Q,C,G,N,P), so that $e_1$=('A', C→16, C)='D'.

The second character in the data "ABC 123" is encrypted as follows:

$c_f*i+1$ is the shifted position of the located character (9*2+7=25)

C→25=(Y,H,*,@,E,$,L,B,I,X,#,T,M,Z,A,U,Q,C, G,N,P, O,K,R, S,F,J,V,W,D)

$e_2$=('B', C→25, C)='H'

In this example, the first numeric character encryption is as follows:

$c_f*i+1$ is the shifted position of the located character (9*5+7=52)

N→52=(+,0,1,2,3,4,5,6,7,8,9,.,-)

$e_5$=('1', N→52, N)='0'

The shifting and translating steps may be repeated for any remaining characters in the data in order to provide encrypted data. In this example, the encrypted string E=DHP 0.7 is the result of encrypting the original data "ABC 123".

In this exemplary embodiment, encryption of the following data and the encrypted data are illustrated as follows:

| Data (S) | Encrypted Data (E) |
| --- | --- |
| FEDERAL EXPRESS | GL#SKKR XRZFUAR |
| AMERICAN EXPRESS | IUQAIJ*Q N@R$FS@ |
| SCOTTSDALE UNIFIED SCHOOL | VDMTPMJPOW V#IEJH$ GPZMOU |
| 13246 N. 124TH WAY | 1 + 753 X8853 FS XED |
| JOHN SMITH | AGBE VSDT# |
| 938102 8956789 | 589-63 1-30.74 |
| ABC CORP | Y*O XK@X |
| ABCD CORP | H@KZ N*ZN |

In one exemplary embodiment of the present invention, if the encrypted string is $E=(e_1,e_2,e_3, \ldots e_1)$, then the underlying or original string $S=(s_1,s_2,s_3, \ldots . s_L)$ is derived as follows:

For i=1 to 1

```
{
    If e_i is a character in set C
        then
            s_i = translate (e_i, C, C→c_f *i + 1)
        else
            If e_i is a character(digit) in set N
                then
                    s_i = translate (e_i, N, N→c_f *i + 1)
                else
                    no translation of character;
}
```

The character set C (or N) can be sequenced differently for different data (e.g., different customer records or files)

and be configured as a key or password for the data. If character set C (or N) is configured as a key or password, it can be sent separately to the user of system 100 (where it can be decrypted by encryption routine 105 along with encryption key 119). Such a key or password provides further security to protecting sensitive information and makes unauthorized decryption of data even more difficult. Thus, these examples along with FIGS. 1 and 2 illustrate a system and method for encryption and decryption of data in accordance with exemplary embodiments of the present invention.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose, hardware-based computer systems which perform the specified functions or steps, or suitable combinations of special purpose hardware and computer instructions.

As used herein, the terms "user" and "participant" may interchangeably include any person, entity, charitable organization, machine, hardware, software, or business who accesses and uses the system of the invention, including purchasers, merchants, card issuers, financial services companies, healthcare oriented companies (e.g., hospitals, health maintenance organizations, medical offices, and the like), and other systems requiring confidentiality, privacy of information, and protection of related rights. Participants in the system may interact with one another either online or off-line. It is further noted that other participants may be involved in various embodiments of the invention, such as an intermediary settlement institution, though these participants are not always described in detail.

In the foregoing specification, the invention has been described with reference to specific embodiments. Various modifications and changes can be made, however, without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", "includes", "including", or any other variations thereof, are intended to cover a non-exclusive inclusion, such that a process, method, article, or apparatus that comprises or includes a list of elements does not include only those elements but may include other elements not expressly listed or inherent to such process, method, article, or apparatus. Further, no element described herein is required for the practice of the invention unless expressly described as "essential" or "critical".

What is claimed is:

1. A method for facilitating encryption of data, comprising the steps of:
   locating an encryption key;
   locating a character in the encryption key to provide a located character;
   determining a number of characters in the data;
   obtaining a first shifting amount;
   shifting a position of the located character in the encryption key by the obtained first shifting amount to determine a shifted position of the located character in the encryption key, wherein the shifted position is located at a position in the encryption key that is the located character shifted by the obtained first shifting amount;
   translating a character in the data with the character located at the shifted position to provide an encrypted character; and
   repeating the steps of obtaining, shifting, and translating for a second shifting amount different from the first shifting amount, for at least one remaining character in the data in order to provide encrypted data.

2. The method of claim 1, further comprising the step of using the encryption key, in which the located character has been shifted by an obtained shifting amount, to encrypt the data.

3. The method of claim 1, further comprising the step of parsing the data into a plurality of strings of data and selecting a string of data to be encrypted.

4. The method of claim 1, further comprising the step of using at least one of identification data, financial data, and production data as the data.

5. The method of claim 1, wherein the step of locating an encryption key comprises obtaining a pre-selected encryption key or, if an encryption key is not pre-selected, selecting an encryption key.

6. The method of claim 1, wherein the step of locating a character in the encryption key to provide a located character includes the steps of:

locating a first alpha character in the encryption key, if an alpha character is present in the encryption key, to provide the located character; and locating a first numeric character in the encryption key, if an alpha character is not present in the encryption key, to provide the located character.

7. The method of claim 1, wherein an obtained shifting amount includes at least one of an amount relative to the number of characters in the data, an amount equal to the number of characters in the data minus one, and an amount equal to a multiple of the position of the located character.

8. The method of claim 1, further comprising the steps of:

setting the data equal to a string of characters S=(s1, s2, s3, . . . s1);

shifting the position of the located character in the encryption key by an amount $\alpha$, wherein the step of shifting the position of the located character is represented by $C \rightarrow \alpha = (c_\alpha, c_{\alpha+1}, c_{\alpha+2}, \ldots c_{n-1}, c_n, c_2, \ldots c_{\alpha-1})$;

translating the first character in the data with the character located at the shifted position to provide an encrypted character $e_i$=translate $(s_i, C \rightarrow c_f*i+1, C)$ wherein $c_f$ represents the position of the located character in the encryption key, and i represents a counter; and providing an encrypted string represented by E=(e1, e2, e3, . . . e1).

9. The method of claim 8, wherein $\alpha = c_f*i+L$ or $\alpha = c_f*i+L-1$, and wherein L represents the number of characters in the data.

10. The method of claim 1, further comprising the step of decrypting the encrypted data, wherein the step of decrypting comprises the steps of:

locating a decryption character in the encryption key to provide a located decryption character;

determining the number of characters in the encrypted data;

obtaining a decryption shifting amount;

shifting the position of the located decryption character in the encryption key by the obtained decryption shifting amount to determine a shifted decryption position of the located decryption character in the encryption key, wherein the shifted decryption position is located at a position in the encryption key that is the located decryption character shifted by the obtained decryption shifting amount; and translating a first character in the encrypted data with the character located at the shifted decryption position to provide a decrypted character.

11. A method for facilitating decryption of encrypted data, comprising the steps of:

locating an encryption key;

locating a character in the encryption key to provide a located character;

determining a number of characters in the encrypted data;

obtaining a first shifting amount;

shifting a position of the located character in the encryption key by the obtained first shifting amount to determine a shifted position of the located character in the encryption key, wherein the shifted position is located at a position in the encryption key that is the located character shifted by the obtained first shifting amount;

translating a character in the data with the character located at the shifted position to provide a decrypted character; and repeating the steps of obtaining, shifting, and translating for a second shifting amount different from the first shifting amount, for at least one remaining character in the data in order to provide decrypted data.

12. The method of claim 11, wherein an obtained shifting amount includes at least one of an amount relative to the number of characters in the data, an amount equal to the number of characters in the data minus one, and an amount equal to a multiple of the position of the located character.

13. A system for facilitating encryption of data using an encryption key, comprising:

a computer including a memory for storing the data and the encryption key and a processor for processing the data; and an application program stored in the memory and accessible by the processor for directing processing of the data by the processor, wherein the application program is configured for:

locating an encryption key;

locating a character in the encryption key to provide a located character;

determining a number of characters in the data;

obtaining a first shifting amount;

shifting a position of the located character in the encryption key by the obtained first shifting amount to determine a shifted position of the located character in the encryption key, wherein the shifted position is located at a position in the encryption key that is the located character shifted by the obtained first shifting amount;

translating a character in the data with the character located at the shifted position to provide an encrypted character; and repeating the steps of obtaining, shifting, and translating for a second shifting amount different from the first shifting amount, for at least one remaining character in the data in order to provide encrypted data.

14. The system of claim 13, wherein the computer uses a mainframe platform.

15. The system of claim 13, wherein the computer uses at least one of the following platforms: OS/390, z/OS, SUN™ SOLARIS™, MICROSOFT™ WINDOWS™, and UNIX.

16. The system of claim 13, wherein the computer uses at least one of the following languages: COBOL, C, C++, OBJECT REXX™, and JAVA™.

\* \* \* \* \*

UNITED STATES PATENT AND TRADEMARK OFFICE
CERTIFICATE OF CORRECTION

PATENT NO. : 7,257,225 B2 Page 1 of 1
APPLICATION NO. : 10/747541
DATED : August 14, 2007
INVENTOR(S) : Srinivas V. Dasari et al.

It is certified that error appears in the above-identified patent and that said Letters Patent is hereby corrected as shown below:

COLUMN 9

Line 43, "If Si" should read --If $S_i$--.

Signed and Sealed this

Fourth Day of December, 2007

JON W. DUDAS
*Director of the United States Patent and Trademark Office*